United States Patent [19]

McGrath et al.

[11] Patent Number: 5,353,753
[45] Date of Patent: Oct. 11, 1994

[54] TWO-STROKE ENGINE LUBRICATION

[75] Inventors: Phillip B. McGrath, Sterling Heights; Kenneth J. Buslepp, Shelby Township, Macomb County, both of Mich.

[73] Assignee: General Motors Corporation, Detroit, Mich.

[21] Appl. No.: 76,671

[22] Filed: Jun. 15, 1993

[51] Int. Cl.$^5$ .............................................. F01M 1/18
[52] U.S. Cl. .................... 123/73 AD; 123/196 R; 184/63
[58] Field of Search ........... 123/73 AD, 196 R, 73 R; 184/6.3, 6.22, 6.4, 7.4

[56] References Cited

U.S. PATENT DOCUMENTS

| | | | |
|---|---|---|---|
| 3,451,214 | 6/1969 | Bradley | 184/6.22 |
| 3,804,201 | 4/1974 | Rombi et al. | 123/73 AD |
| 4,363,214 | 12/1982 | Kiser | 184/6.3 |
| 4,480,602 | 11/1984 | Kobayashi et al. | 123/73 AD |
| 4,632,085 | 12/1986 | Misawa et al. | 123/73 AD |
| 4,638,771 | 1/1987 | Mori | 123/73 AD |
| 4,730,580 | 3/1988 | Matsushita | 123/73 AD |
| 4,825,826 | 5/1989 | Andres | 184/6.3 |
| 4,887,559 | 12/1989 | Hensel et al. | 123/73 AD |
| 4,945,864 | 8/1990 | Solomon et al. | 123/41.39 |
| 4,955,943 | 9/1990 | Hensel et al. | 123/73 AD |
| 4,966,105 | 10/1990 | Mori | 123/73 AD |
| 4,967,700 | 11/1990 | Torigai | 123/73 AD |
| 5,121,720 | 6/1992 | Roberts | 184/6.3 |
| 5,150,692 | 9/1992 | Trombley et al. | 123/533 |
| 5,236,064 | 8/1993 | Wagoner | 184/6.3 |

Primary Examiner—Tony M. Argenbright
Assistant Examiner—M. Macy
Attorney, Agent, or Firm—Michael J. Bridges

[57] ABSTRACT

Adjustment to the lubrication rate for a period of time after startup of a two-stroke internal combustion engine, wherein the magnitude of the adjustment over the period of time is determined from an estimate of the degree the lubricant has receded from the moving parts of the engine exposing the moving parts to an elevated potential for wear, and from an estimate of the rate at which lubricant in the engine may be recirculated to the moving parts to reduce the elevated potential.

6 Claims, 4 Drawing Sheets

TWO-STROKE ENGINE LUBRICATION

FIELD OF THE INVENTION

This invention relates to two-stroke engine lubrication and, more specifically, to compensation of the lubrication rate of two-stroke engines for a period of time after engine startup.

BACKGROUND OF THE INVENTION

The lubricant in a dry sump, two-stroke engine recedes from the moving parts of the engine and into the crankcase after the engine has been disabled. The rate at which any lubricating film deposited on the moving parts recedes from the parts and into the crankcase is a function of the amount of time the engine has been disabled. After a period of time, the film is substantially depleted from the moving parts.

Upon engine restart, the degree of film remaining on the moving parts determines the degree of protection of the moving parts against engine friction for a period of time until appropriate circulation of the oil settled into the crankcase can re-establish a protective film on the moving parts. Significant wear of the moving parts may occur during the period of time until such circulation occurs.

It is generally known to introduce lubricant to a two-stroke engine at a rate proportional to certain engine operating conditions, such as a commanded fueling rate to the engine. Such conventional approaches do not account for the heightened potential for engine wear at startup, leaving the engine exposed to a significant wear condition.

Accordingly, what is needed is an approach to lubrication of a dry sump two-stroke engine that addresses the potential for significant engine wear associated with certain engine startup conditions.

SUMMARY OF THE INVENTION

The present invention addresses the above-described shortcomings of conventional two-stroke lubrication approaches by adjusting the lubrication rate of a two-stroke engine at startup in response to an estimate of the degree of lubricant film remaining on the moving parts of the engine.

Specifically, the amount of time the engine has been disabled is estimated, for example as a function of the difference between engine temperature and ambient temperature, and the initial commanded fuel/oil ratio enleaned as a function of the estimate. An fuel/oil ratio enleanment profile is then followed for a calibrated period of time after engine startup based on the initial fuel/oil ratio and based on a decaying need for enleanment, as calibrated for the specific engine being lubricated, to ensure adequate enleanment throughout an initial course of engine operation.

A reduction in engine wear is provided through application of the approach of this invention at a stage of engine operation in which wear is likely to occur. Excess fuel/oil ratio enleanment is avoided by limiting the disruption from a preferred fuel/oil ratio during normal engine operation to the amount needed for adequate priming of the engine during an initial period of time after engine startup.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
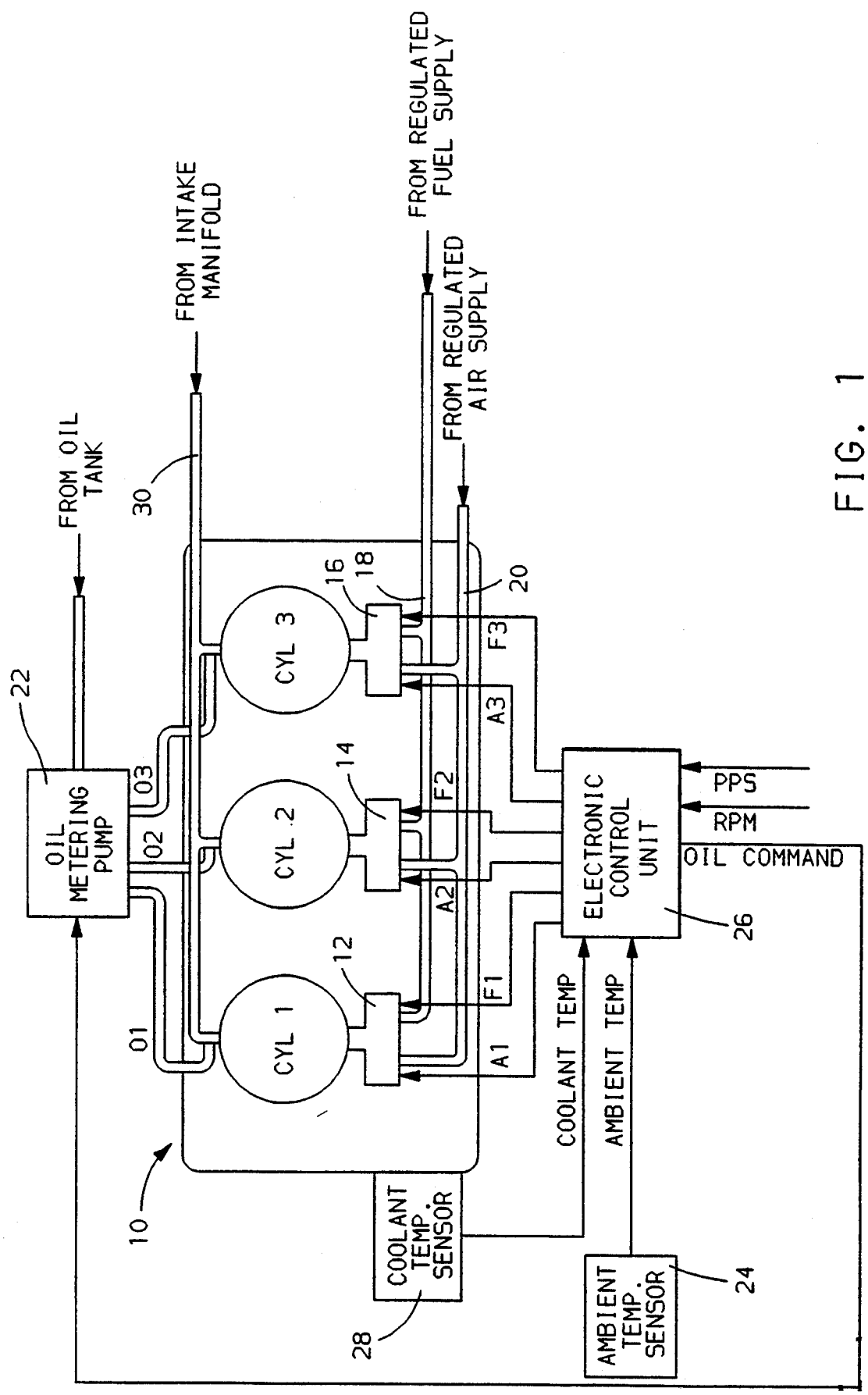
FIG. 1 is a general diagram of a two-stroke engine and engine control unit to which this invention is applied in accord with a preferred embodiment.

Referring to FIG. 1, a two-stroke internal combustion engine 10 is shown having cylinders CYL 1, CYL 2, and CYL 3. Each cylinder is directly fueled by a conventional pneumatic fuel injection system including dedicated selectively operable solenoid actuated fuel injectors 12, 14, and 16, with a fuel conduit 18 and an air conduit 20 for delivering pressurized fuel and air to the injectors.

A regulated air supply (not shown) provides air to conduit 20 at a predetermined air pressure, and a regulated fuel supply (not shown) provides fuel to fuel conduit 18 at a predetermined fuel pressure, in accord with well-known pneumatic fuel injection practice. In the preferred embodiment, the predetermined air pressure is approximately 550 kPa above atmospheric pressure, and the predetermined fuel pressure is approximately 620 kPa above atmospheric pressure.

An electronic control unit ECU 26 is provided, such as a conventional single chip microcontroller, which processes generally known input signals and communicates appropriate engine control commands to various conventional actuators in accord with generally understood principles of engine control.

A conventional engine speed sensor (not shown) provides a signal RPM indicative of engine speed to ECU 26 for use in conventional engine control. A pedal position sensor (not shown) provides a signal PPS to ECU 26, wherein PPS is indicative of a position of a conventional acceleration pedal away from a rest position as motivated by an engine operator, as is generally known in the art of engine control.

A conventional coolant temperature sensor 28 is located in position to measure engine coolant temperature, and communicate a signal COOLANT TEMP indicative thereof to ECU 26. An ambient temperature sensor 24 is in position to monitor temperature external to engine 10 and substantially unperturbed by the engine temperature, and communicate such ambient temperature as a signal AMBIENT TEMP to ECU 26.

Engine inlet air is provided to the engine cylinders CYL 1, CYL 2, and CYL 3 from an intake manifold (not shown) via intake conduit 30. Conventional engine lubricant is provided from a reservoir, such as an oil tank (not shown) to a conventional oil metering pump 22. The pump 22 meters the lubricant to the inlet air path of each of the engine cylinders via respective output conduits 01-03, at a rate determined by a command OIL COMMAND issued from the ECU 26. The oil is substantially atomized and drawn into the cylinders of the engine by the intake airflow through conduit 30, in accord with general two-stroke engine lubrication practice. OIL COMMAND in this embodiment is a frequency modulated command, wherein the frequency at which a pulse of a fixed duration of approximately thirty milliseconds is modulated in proportion to a desired lubrication rate to the engine 10. Oil is metered to the conduits 01-03 for the duration of each OIL COMMAND pulse.

In the conventional pneumatic direct fuel injection system of this embodiment, the ECU 26 periodically determines a desired fueling rate to the engine 10 in the form of a desired fuel injection period and a desired air injection period. The ECU 26 then generates pulse signals F1-F3 and A1-A3 to be issued to individual respective fuel and air solenoids (not shown) within fuel injectors 12, 14, and 16, at appropriate rotational positions of the engine as determined from the RPM input signal.

The width of the output pulses F1-F3 determines the metered quantity of fuel that is deposited in a holding chamber within each of the respective fuel injectors 12, 14, and 16. The air pulses A1-A3 are timed by the ECU 26 to open each nozzle (not shown) of the respective fuel injectors 12, 14, and 16, to initiate the start of cylinder fuel injection a predetermined period of time, typically one to three milliseconds, after the fuel has been injected into the holding chamber. The width of each air pulse A1-A3, commonly referred to as the cylinder injection period, determines the length of time that each injector nozzle remains open.

During the cylinder injection period, pressurized air from the regulated air supply (not shown) enters an injector and drives the metered fuel from its holding chamber through the open nozzle and directly into the associated engine cylinder. The pressurized air serves to atomize the fuel for clean combustion and enables the fuel to be injected directly into a combustion chamber against opposing cylinder combustion pressure.

Additionally in this embodiment, a desired oiling rate to the engine is periodically determined in accord with conventional two-stroke engine control practice, to adequately lubricate the internal moving parts of the engine for the engine operating point, such as may be indicated by the desired fueling rate to the engine. The desired oiling rate is converted to a frequency with which to drive the oil metering pump 22, wherein the frequency is the rate at which the approximate thirty millisecond pulse is applied to pump 22, as described.

Figure 2:
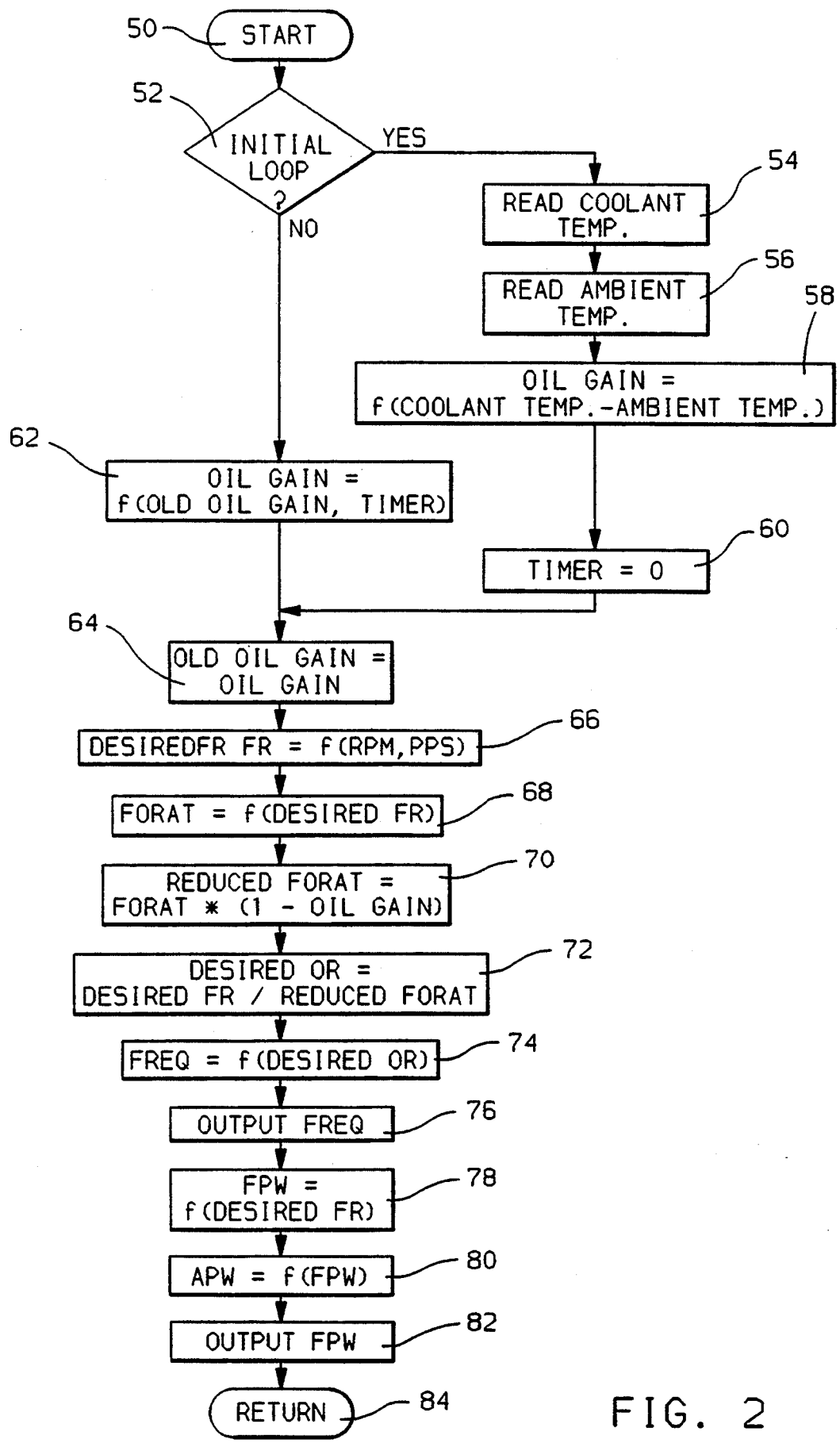
FIG. 2 is a computer flow diagram depicting steps used to carry out the principles of this invention in the preferred embodiment and with the general diagram of FIG. 1.

The duration of the fuel commands F1-F3, the air commands A1-A3 and the desired frequency of OIL COMMAND are determined in this embodiment as described in FIG. 2. The series of steps illustrated in FIG. 2 may be stored in non-volatile memory of ECU 26 (FIG. 1) as a series of computer instructions to be periodically executed by the ECU 26 in a manner generally understood in engine control. In this embodiment, the routine consisting of the steps of FIG. 2 is executed when fuel, air and lubrication commands to the engine 10 are to be updated, such as approximately every ten milliseconds while the ECU 26 is operating.

The routine of FIG. 2 starts at step 50 and moves to step 52 to determine if the present iteration of the routine of FIG. 2 is the first since power was applied to the ECU 26 after engine startup. If the present loop is the first since power was applied to the ECU, the routine reads coolant temperature from the ECU input signal COOLANT TEMP at step 54. The routine then reads ambient air temperature from the ECU input signal AMBIENT TEMP at step 56. The routine next computes OIL GAIN as a function of the difference between COOLANT TEMP and AMBIENT TEMP. This temperature difference is used in this embodiment as a convenient estimate of the amount of time the engine 10 has not been running, and thus the amount of time the lubricant in the engine has been receding from internal moving parts. In accord with this invention, the initial lubrication rate of the internal moving parts of the engine 10 is varied in response to an estimate of the degree by which the lubricant has receded from the internal moving parts of the engine.

The estimate may be made by direct measurement of the engine off time, such as by a timer activated when the engine is disabled, or by a measurement of an engine condition reflective of engine off time, such as the manner in which the engine temperature has changed since the engine was last disabled. The inventors intend that any measurement or estimate of the degree that the engine lubricant has receded from moving parts requiring lubrication during engine operation is within the scope of this invention, and may be used in an adjustment of lubrication rate for a period of time following engine startup in accord with this invention.

Returning to step 58 of FIG. 2, OIL GAIN is an adjustment to a desired fuel/oil ratio admitted to the engine 10 for a period of time after startup of the engine in accord with this invention. Specifically, OIL GAIN is a decrease factor by which the commanded fuel/oil ratio is decreased for a given commanded fuel rate to the engine 10.

At step 58, an initial value is assigned to OIL GAIN as a function of the estimate of the engine off time. A profile of oil enrichment will then be followed during the period of time after engine startup with the OIL GAIN determined at step 58 as the starting value of the profile. Any non-zero oil gain in this embodiment will result in a decreased commanded fuel/oil ratio, which will increase the amount of oil admitted to the engine per unit admitted fuel, as will be described.

Figure 3:
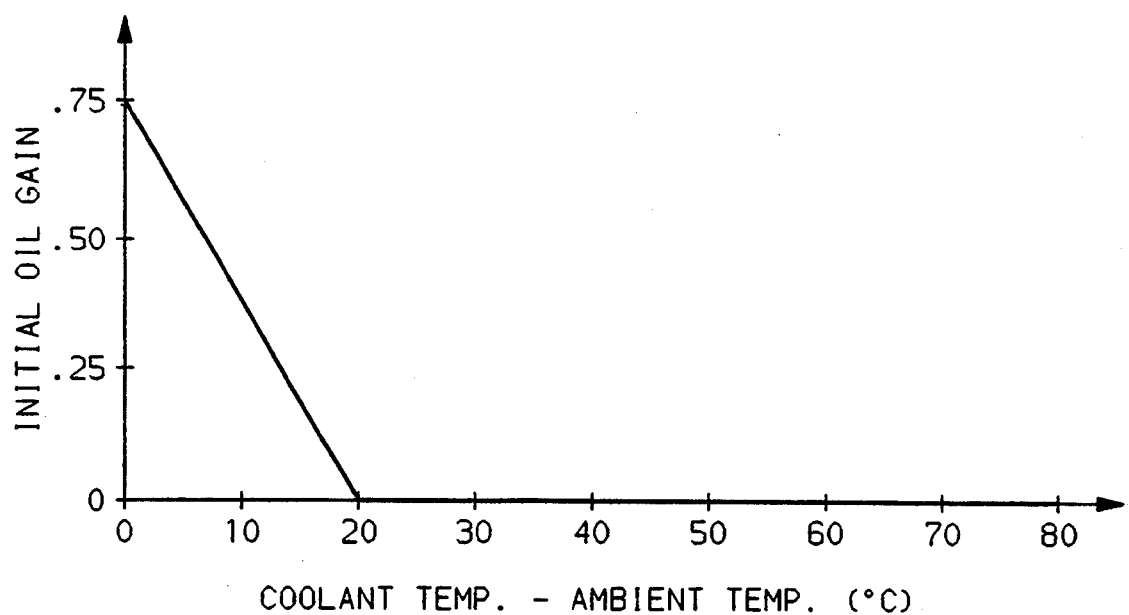
FIGS. 3-5 are diagrams generally illustrating parametric relationships used in the preferred embodiment of this invention.

FIG. 3 illustrates a typical relationship between the temperature difference of step 58 and the initial OIL GAIN. For greater temperature differences, indicating elevated engine temperature, it is assumed the engine was only turned off for a short period of time, and thus significant lubricant film remains on the moving parts of the engine. Accordingly, little or no oil gain is necessary for such a startup condition. As engine temperature at engine startup approaches ambient temperature, a longer engine turn-off time is assumed. Consequently, more oil enrichment at startup is assumed to be necessary, and OIL GAIN is increased accordingly. A look-up table may be used to determine OIL GAIN at step 58, wherein the relationship illustrated in FIG. 3 is stored in non-volatile memory of ECU 26 (FIG. 1), such as by a plurality of temperature difference values paired with a plurality of initial OIL GAIN values. Appropriate initial OIL GAIN values are referenced from the look-up table in a conventional manner using the present temperature difference from step 58 as a look-up parameter.

After determining OIL GAIN at step 58, the routine moves to step 60, to initialize TIMER, a variable stored in ECU 26 memory, used to indicate the amount of elapsed time since the initial loop of the routine of FIG. 2. TIMER is stored in ECU memory (not shown) and is maintained in a background loop in accord with generally known principles of computer based controls, wherein TIMER in incremented periodically, such as every second of real time. After initializing TIMER at step 60, the routine moves to step 64, to be described.

Returning to step 52, if the present iteration of the routine of FIG. 2 is not the first since power was most recently applied to the ECU 26 (FIG. 1), the routine proceeds to step 62, to update OIL GAIN for the present estimate of the lubricant needs of the engine. This update is a function of the most recent prior OIL GAIN, stored in ECU memory as OLD OIL GAIN, and of TIMER which is the amount of time since the first iteration of the routine of FIG. 2, as discussed.

Figure 4:
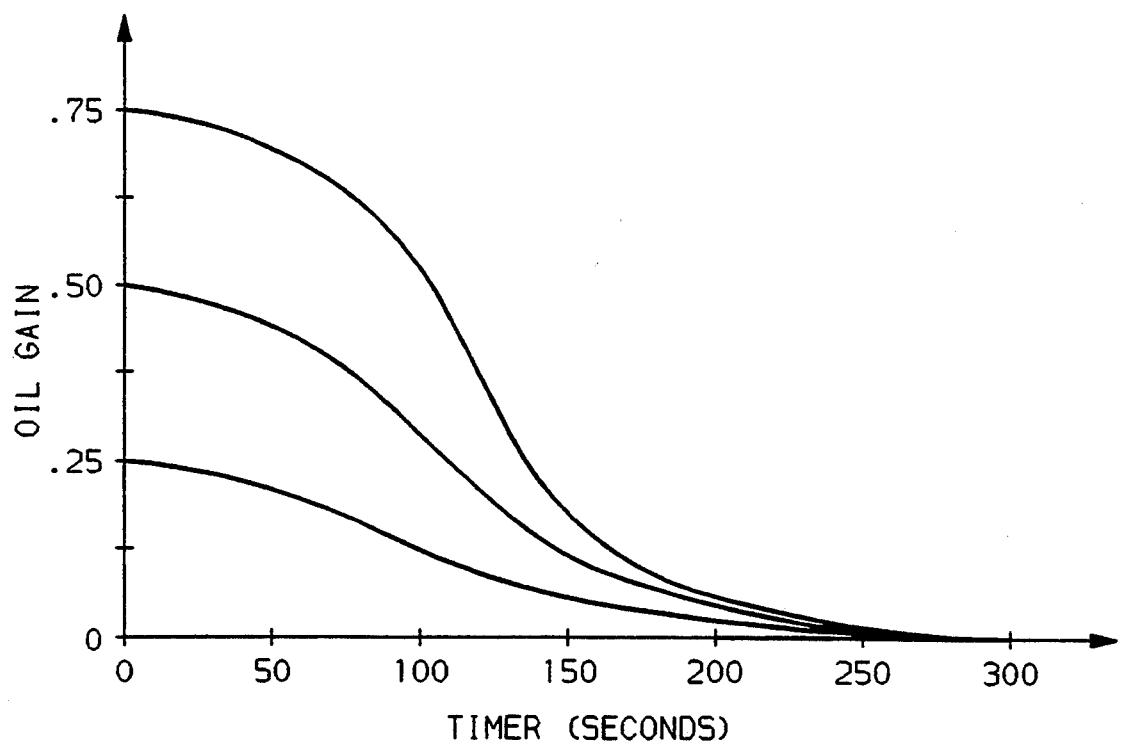

FIG. 4 illustrates a representative series of profiles for varying initial OIL GAIN values as a function of TIMER. The initial value on each of the profiles is set when TIMER is zero, which is in the initial loop of the routine of FIG. 2, such as from the relationship illustrated in FIG. 3, as discussed. The profiles then decrease over time from the initial OIL GAIN toward approximately zero gain (or approximately zero fuel/oil ratio reduction) at around 300 seconds after engine startup in this embodiment. The profiles may be calibrated according to the startup lubrication rate adjustment in accord with this invention necessary to provide appropriate lubrication adjustment to the engine to which the gain is applied to compensate for the depletion of lubricant on the engine moving parts during the time the engine was last disabled.

The compensation is, in this embodiment, determined to be unnecessary after approximately 300 seconds of engine operation, after which normal lubrication is assumed to typically be sufficient to protect the moving parts of the engine from excessive startup wear. The calibration values representing the adjustment profiles, such as those of FIG. 4 may be stored in ECU non-volatile memory (not shown) as a conventional look-up table, and the gain values referenced therefrom as a function of the present TIMER value and OLD OIL GAIN, as described.

After determining a present OIL GAIN at step 62, the routine moves to step 64 to store the present updated OIL GAIN in ECU memory as OLD OIL GAIN, for use in the next iteration of the routine of FIG. 2. The routine then determines a desired engine fueling rate FR at step 66 in a conventional manner in two-stroke engine applications as a function of RPM and PPS, such as from a look-up table in ECU memory. The FR entries in the table may be determined during conventional engine calibration as the fueling rate necessary for given RPM and PPS values to provide beneficial engine fuel economy, output power, and exhaust pollutant levels, in a manner generally understood in the art of two-stroke engine control.

Figure 5:
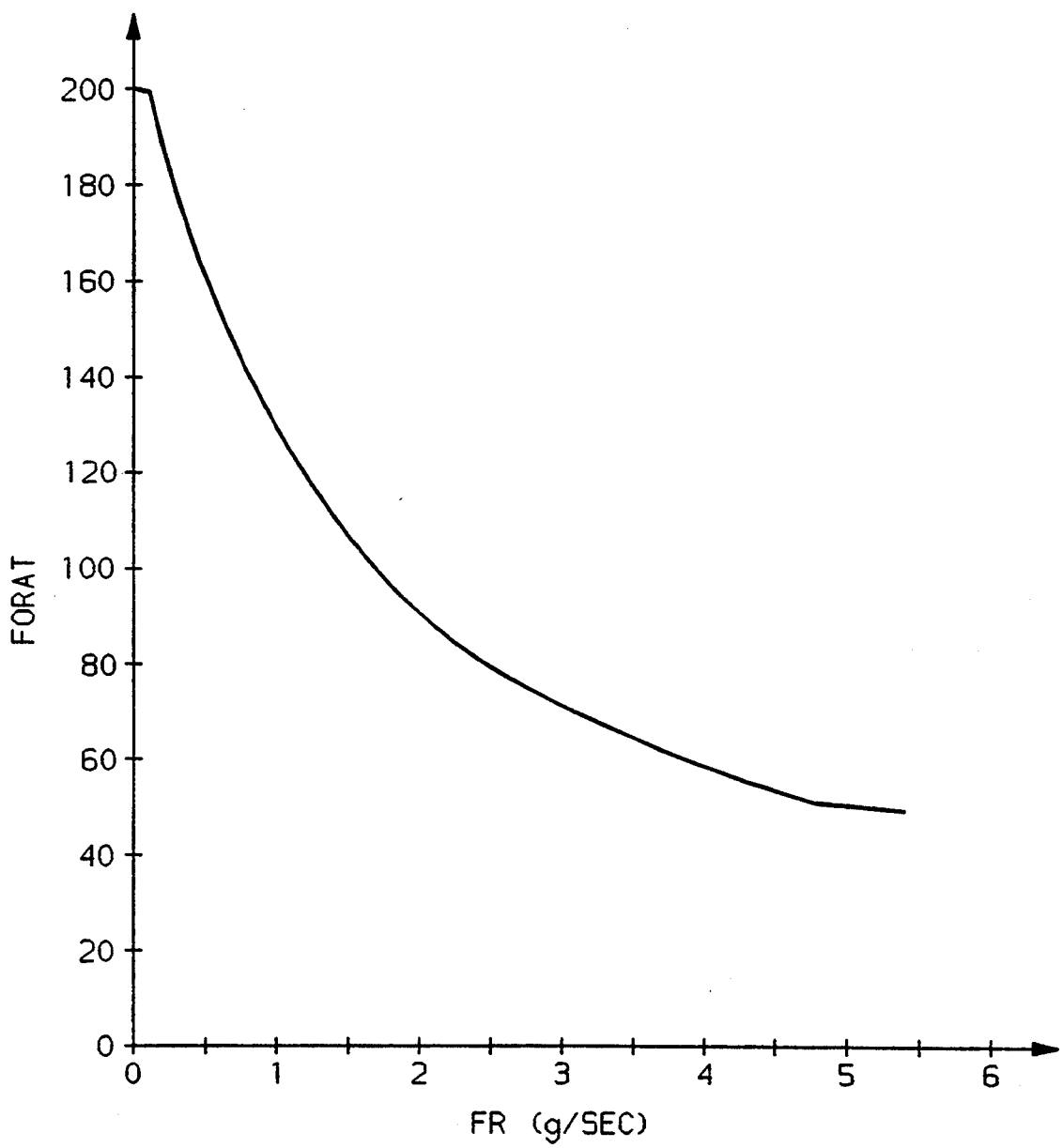

The routine next proceeds to step 68 to reference a desired fuel/oil ratio FORAT from the desired fueling rate FR as determined at step 66. It is generally known that a two-stroke engine desired FORAT may be determined as a function of FR. FORAT in this embodiment may be calibrated using generally known principles in two-stroke engine control and may be referenced from ECU memory such as in a conventional lookup table format as a function of FR. FIG. 5 illustrates a typical relationship between fueling rate FR and desired fuel/oil ratio FORAT for a conventional two-stroke engine application. At an engine operating point consistent with high FR, a low FORAT ensures the engine will be provided additional lubricant as needed to reduce associated high frictional components in the engine. Less lubricant per unit fuel (a high FORAT) is preferred at engine operating points consistent with lower FR values. Such relationships, for example as illustrated in FIG. 5, are consistent with principles generally understood by those skilled in the art of two-stroke engine lubrication.

After referencing FORAT from FR at step 68, the routine moves to step 70, to calculate a reduced fuel/oil ratio REDUCED FORAT as follows $$REDUCED\ FORAT = FORAT * (1 - OIL\ GAIN),$$

to decrease the fuel/oil ratio commanded to the engine in accord with the engine start up needs as reflected by OIL GAIN. Next, at step 72, a desired oiling rate DESIRED OR is calculated directly from DESIRED FR and REDUCED FORAT as follows $$DESIRED\ OR = DESIRED\ FR / REDUCED\ FORAT.$$

DESIRED OR is then converted to a desired command frequency FREQ to be issued to oil metering pump 22 (FIG. 1) as described, wherein FREQ may be referenced from a look-up table in ECU memory as the frequency at which to issue the thirty millisecond pulses of this embodiment to the oil metering pump 22 to provide the desired oiling rate to the oil conduits 01–03. The relationship between FREQ and DESIRED OR may be calibrated for the specific pump 22 used, using generally known calibration procedures. After referencing an appropriate FREQ at step 74, the FREQ command is output to the oil metering pump 22 (FIG. 1) as the described OIL COMMAND at step 76, to drive oil through conduits 01–03 at the desired oil metering rate, as described.

Next, the routine moves to step 78, to determine a fuel pulse width FPW as a function of DESIRED FR by referencing FPW in a look-up table stored in ECU memory (not shown) as the pulse width necessary to meter fuel to the cylinders of the engine 10 at the desired fueling rate DESIRED FR. The look-up table may be generated from a calibration of the fuel control system generally illustrated in FIG. 1 using generally known calibration principles.

After referencing an appropriate FPW at step 78, the routine moves to step 80 to determine a value for the desired air pulse width APW, which represents the desired duration of the cylinder injection period during which the high pressure air from conduit 20 (FIG. 1) blasts fuel from a cylinder holding chamber into the associated engine cylinder.

APW may be determined from a look-up table stored in non-volatile memory of ECU 26 as a function of the FPW determined at step 78. The APW entries in the table are intended to be those found during conventional engine calibration to provide beneficial engine fuel economy, output power, and exhaust pollutant levels, in a manner generally understood in the engine control art.

After determining a suitable APW at step 80, the routine advances to step 82, to output the computed FPW to an appropriate fuel solenoid as dictated by the rotational position of the engine 10 within an engine cycle, such as from the ECU 26 input signal RPM (FIG. 1). The APW command will be issued at a later time, typically one to three milliseconds after the issuance of FPW at step 82. The time of the air command may be computed in accord with generally known engine control principles, and may be issued to the air solenoids of injectors 12, 14, and 16 by operation of ECU 26 (FIG. 1) or by operation of conventional electronic circuitry.

After outputting the FPW command at step 82, the routine of FIG. 2 advances to step 84 to return to any activity that was taking place prior to the start of the present iteration of the routine of FIG. 2. As described, the routine of FIG. 2 will be periodically re-executed in the step-by-step manner described above, when fuel, air, and lubrication commands are to be updated.

The preferred embodiment for the purpose of explaining this invention is not to be taken as limiting or restricting the invention since many modifications may be made through the exercise of skill in the art without departing from the scope of the invention.

The embodiments of the invention in which a property or privilege is claimed are described as follows:

1. A method for providing an adjustment to the rate at which lubricant is provided to a two-stroke internal combustion engine, comprising the steps of:
   estimating an amount of time the engine has not been operating following a startup of the engine;
   determining a lubrication rate adjustment as a predetermined function of the estimated amount of time the engine has not been operating; and
   adjusting the rate at which lubricant is provided to the engine by the determined lubrication rate adjustment.

2. The method of claim 1, wherein the estimating step further comprises the steps of:
   estimating engine temperature following an engine startup;
   sensing ambient air temperature following the engine startup;
   calculating a temperature difference between the estimated engine temperature and the sensed ambient air temperature; and
   estimating an amount of time the engine has not been operating as a predetermined function of the calculated temperature difference.

3. The method of claim 2, wherein the step of estimating engine temperature further comprises the steps of:
   sensing engine coolant temperature;
   estimating engine temperature as a predetermined function of sensed engine coolant temperature.

4. A method for adjusting a lubrication rate for a two-stroke internal combustion engine following an engine startup, comprising the steps of:
   estimating an amount of time the engine has not been operating following the engine startup;
   determining an initial lubrication rate adjustment as a predetermined function of the estimated amount of time the engine has not been operating;
   determining a lubrication rate adjustment profile as a predetermined function of the determined initial lubrication rate adjustment and as a predetermined function of time;
   periodically adjusting the lubrication rate in accord with the determined lubrication rate adjustment profile.

5. The method of claim 4, wherein the estimating step further comprises the steps of:
   estimating engine temperature following the engine startup;
   sensing ambient air temperature following the engine startup;
   calculating a difference between the estimated engine temperature and the sensed ambient air temperature; and
   estimating an amount of time the engine has not been operating as a predetermined function of the calculated difference.

6. The method of claim 4, wherein the step of determining a lubrication rate adjustment profile determines the profile as a sequence of lubrication rate adjustments beginning with the determined initial lubrication rate adjustment and decreasing in magnitude toward a zero adjustment with a time rate of decrease proportional to a predetermined time rate at which lubricant is restored to the engine following the engine startup.

* * * * *